United States Patent
Krishnamoorthy et al.

(10) Patent No.: US 12,260,469 B2
(45) Date of Patent: Mar. 25, 2025

(54) SYSTEMS AND METHODS FOR INTELLIGENT STEGANOGRAPHIC PROTECTION

(71) Applicant: BANK OF AMERICA CORPORATION, Charlotte, NC (US)

(72) Inventors: Madhusudhanan Krishnamoorthy, Srivilliputtur (IN); Paramita De, Kolkata (IN); Pawan Kumar Jha, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/369,929

(22) Filed: Sep. 19, 2023

(65) Prior Publication Data

US 2024/0005441 A1    Jan. 4, 2024

Related U.S. Application Data

(63) Continuation of application No. 17/349,604, filed on Jun. 16, 2021, now Pat. No. 11,798,117.

(51) Int. Cl.
| | | |
|---|---|---|
| G06K 9/00 | (2022.01) | |
| G06N 3/045 | (2023.01) | |
| G06T 1/00 | (2006.01) | |
| H04W 4/029 | (2018.01) | |

(52) U.S. Cl.
CPC ........... *G06T 1/0085* (2013.01); *G06N 3/045* (2023.01); *H04W 4/029* (2018.02); *G06T 2201/0061* (2013.01)

(58) Field of Classification Search
None
See application file for complete search history.

(56) References Cited

U.S. PATENT DOCUMENTS

| | | |
|---|---|---|
| 8,355,923 B2 | 1/2013 | Gervais et al. |
| 8,468,244 B2 | 6/2013 | Redlich et al. |
| 8,606,746 B2 | 12/2013 | Yeap et al. |
| 9,015,171 B2 | 4/2015 | Bayliss |

(Continued)

FOREIGN PATENT DOCUMENTS

| | | | |
|---|---|---|---|
| EP | 1137251 A2 * | 9/2001 | ............... A61N 1/00 |
| WO | 2021247038 A1 | 12/2021 | |

(Continued)

OTHER PUBLICATIONS

Baluja ("Hiding Images in Plain Sight: Deep Steganography", 31st Conference on Neural Information Processing Systems (NIPS 2017), Long Beach, CA, USA). (Year: 2017).

*Primary Examiner* — Shervin K Nakhjavan
(74) *Attorney, Agent, or Firm* — Moore & Van Allen PLLC; Nicholas C. Russell

(57) ABSTRACT

The present invention generally relates to the field of automated and flexible information extraction and protection for graphical data. In particular, the invention provides a unique platform for analyzing, classifying, extracting, and processing information from images using deep learning image detection models. Embodiments of the inventions are configured to provide an end to end automated solution for intelligently hiding or obscuring private data from graphical displays via the use of embedded steganographic image data techniques.

20 Claims, 8 Drawing Sheets

(56) References Cited

U.S. PATENT DOCUMENTS

| | | | |
|---|---|---|---|
| 9,087,215 B2 | 7/2015 | Lafever et al. | |
| 9,129,133 B2 | 9/2015 | Lafever et al. | |
| 9,223,995 B1 | 12/2015 | Lavinio | |
| 9,361,481 B2 | 6/2016 | Lafever et al. | |
| 9,547,769 B2 | 1/2017 | Aissi et al. | |
| 9,582,680 B2 | 2/2017 | Bilodeau et al. | |
| 9,619,669 B2 | 4/2017 | Lafever et al. | |
| 9,659,182 B1 | 5/2017 | Roundy et al. | |
| 9,805,217 B2 | 10/2017 | Brandt et al. | |
| 10,043,035 B2 | 8/2018 | Lafever et al. | |
| 10,268,947 B2 * | 4/2019 | Wang | G06T 7/248 |
| 10,394,634 B2 | 8/2019 | Chagam Reddy | |
| 10,395,059 B2 | 8/2019 | Scaiano et al. | |
| 10,572,684 B2 | 2/2020 | Lafever et al. | |
| 10,903,980 B2 | 1/2021 | Peterson et al. | |
| 10,915,809 B2 * | 2/2021 | Krishnamoorthy | G06T 1/005 |
| 10,963,579 B2 | 3/2021 | Lemmey et al. | |
| 11,399,079 B2 * | 7/2022 | Raduchel | H04W 4/21 |
| 2010/0223576 A1 | 9/2010 | Serra et al. | |
| 2019/0287204 A1 * | 9/2019 | Kakkirala | G06T 1/005 |
| 2022/0331841 A1 * | 10/2022 | Filler | G06K 19/06037 |
| 2022/0405875 A1 * | 12/2022 | Krishnamoorthy | G06N 3/0464 |

FOREIGN PATENT DOCUMENTS

| | | | | |
|---|---|---|---|---|
| WO | WO-2024086774 A1 * | 4/2024 | | A61N 1/00 |
| WO | WO-2024151812 A1 * | 7/2024 | | G06Q 10/10 |

* cited by examiner

STEGOANALYSER
CONVOLUTION LAYERS
522

STEGOANALYSER INPUT
LAYER
521

| Layers | Process | Output Size |
|---|---|---|
| Input | / | 1 x 256 x 256 |
| Layer 1 | ConvBlock1 | 8 x 128 x 128 |
| Layer 2 | ConvBlock1 | 16 x 64 x 64 |
| Layer 3 | ConvBlock2 | 32 x 32 x 32 |
| Layer 4 | ConvBlock2 | 64 x 256 x 256 |
| Layer 5 | ConvBlock3 | 32 x 256 x 256 |
| Layer 6 | SPP Block | 2688 x 1 |

STEGOANALYSER
OUTPUT LAYER
523

STEGOANALYER NETWORK ARCHITECTURE
520

Figure 5b

SYSTEMS AND METHODS FOR INTELLIGENT STEGANOGRAPHIC PROTECTION

CROSS-REFERENCE TO RELATED APPLICATION

This application is a continuation of and claims priority to U.S. patent application Ser. No. 17/349,604, filed Jun. 16, 2021, of the same title; the contents of which are also incorporated herein by reference.

FIELD OF THE INVENTION

The present invention generally relates to the field of automated and flexible information extraction and protection for graphical data. In particular, the novel present invention provides a unique platform for analyzing, classifying, extracting, and processing information from images using deep learning image detection models. Embodiments of the inventions are configured to provide an end to end automated solution for intelligently hiding or obscuring private data from graphical displays via the use of embedded steganographic image data techniques.

BACKGROUND

Current tools for data extraction from images which provide an end to end automated solution for extraction and classification of data in consistent useable format are valuable tools for processing graphical information. Seeing as deep learning image detection models involve tremendous effort and resources to train and perfect, preserving the integrity of such models and controlling the distribution of such models is important. In many current processes, techniques and systems, a user is required to manually select graphical attributes and calibrate axis metrics for proper data extraction. As such, these processes are time consuming, prone to human error, and result in data that is not uniform. The output data produced by such conventional solutions are often minimally useful and have a potential for producing unintended effects or unhelpful data analysis when unattended by comprehensive human review.

In terms of conventional solutions for graphical display security, most currently available solutions and devices have to be manually and physically installed as a means of privacy screen protection. For instance, a privacy screen protection sheet may be placed over a user interface display or monitor to obscure displayed information from being viewed at certain angles, distances, or the like. If a user is using a personal device, they may be exposed to security issues in public environments, and may resort to constant diligence in manually obscuring their screen from unauthorized or unintended view. Conventional physical privacy screen protection solutions also include inherent drawbacks; the screen brightness is reduced, and the presentation may be bulky or detract from the overall aesthetic of the device itself. To counter these drawbacks, device brightness typically needs to be increased, leading to higher power consumption, shorter battery cycle life, and decreased battery longevity as a result of more frequent recharging. A dynamic, digital solution is preferable.

The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for intelligent obfuscation of graphical data to provide enhanced privacy of a user device display. In particular, the present invention solves the need for a dynamic digital solution for providing screen privacy through the use of a situationally aware system for selectively applying random image data to a user display screen through the use of a steganographic function based process. As such, the invention provides an intelligent solution at times where sensitive or confidential information may be displayed on-screen and the user device may be within public view.

The system gathers various user data from user devices in order to dynamically determine a level of visibility appropriate given each unique setting, and may also base this determination on specific user preferences or movement patterns. For instance, the system may receive data indicating that a user device is currently connected to a public network or is geolocated at a public area, and may implement a digital screen protection process for obscuring sensitive or confidential information in this instance. In addition, the system may receive data to indicate the orientation of the screen, the user's position relative to the screen, or the like, in order to selectively obfuscate data from being viewed at only certain angles, while retaining visibility from solely the user's determined perspective.

The invention is an ideal solution for users who are flying, commuting, working in a cafe or other public space. Via the use of the system, the user's screen can be protected, and privacy may be provided, as the content displayed on-screen will be visible only from certain customizable viewing angles. Furthermore, at a private location, like the user's home, car, or the like, the user device may be given an option to enable all viewing angles, and the system may log user information received from the user device in these instances in order to create a datastore of trusted scenarios, and locations. In some embodiments, automatic viewing angle restriction can be selected based on location, time, or the like, according the user's set schedule, or according to an inferred pattern or schedule that becomes evident over time according to gathered user data. In preferred embodiments, the implementation of the invention solution will not impact screen brightness when viewing from best viewing angles, thus alleviating the issue of increased power consumption or decreased battery life of conventional display privacy solutions, such as polarized physical screen coverings or shields.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive an original image for analysis from a user device, wherein the original image comprises an image displayed on a graphical user interface of the user device; encode the original image using multiple convolutional neural network layers; embed, simultaneously, a steganographic layer containing randomized portions of a secret image into the encoded image such that the randomized portions of the secret image obscure portions of the original image; and encrypt and store pooling indices for the randomized portions of the secret image in encoding feature variance layers of the encoded image.

In some embodiments, the system is further configured to: apply a stegoanalyser to the encoded image to remove the steganographic layer resulting in a processed encoded image; and decode the processed encoded image using additional multiple convolutional neural network layers to identify and extract feature data.

In some embodiments, the multiple convolutional neural network layers further comprise batch normalization to normalize a scale of the encoded image and reduce internal covariance shift between the multiple convolutional neural network layers.

In some embodiments, the multiple convolutional neural network layers further comprise using one or more linear-activation functions.

In some embodiments, embedding the steganographic layer containing randomized portions of the secret image further comprises applying multiple hidden convolutional layers during encoding and wherein the hidden layers are applied between at least two separate convolutional neural network layers.

In some embodiments, the system is further configured to: receive geolocation data from the user device or one or more auxiliary user devices; based on the geolocation data, determine that the user device is in a public location; and determine portions of the original image to obscure based on the user device being in a public location.

In some embodiments, the system is further configured to: store user-specific location or time preferences, wherein the user-specific location or time preferences comprise specific locations or times wherein the user prefers the system to activate; and continuously monitor geolocation data received from the user device or one or more auxiliary devices.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
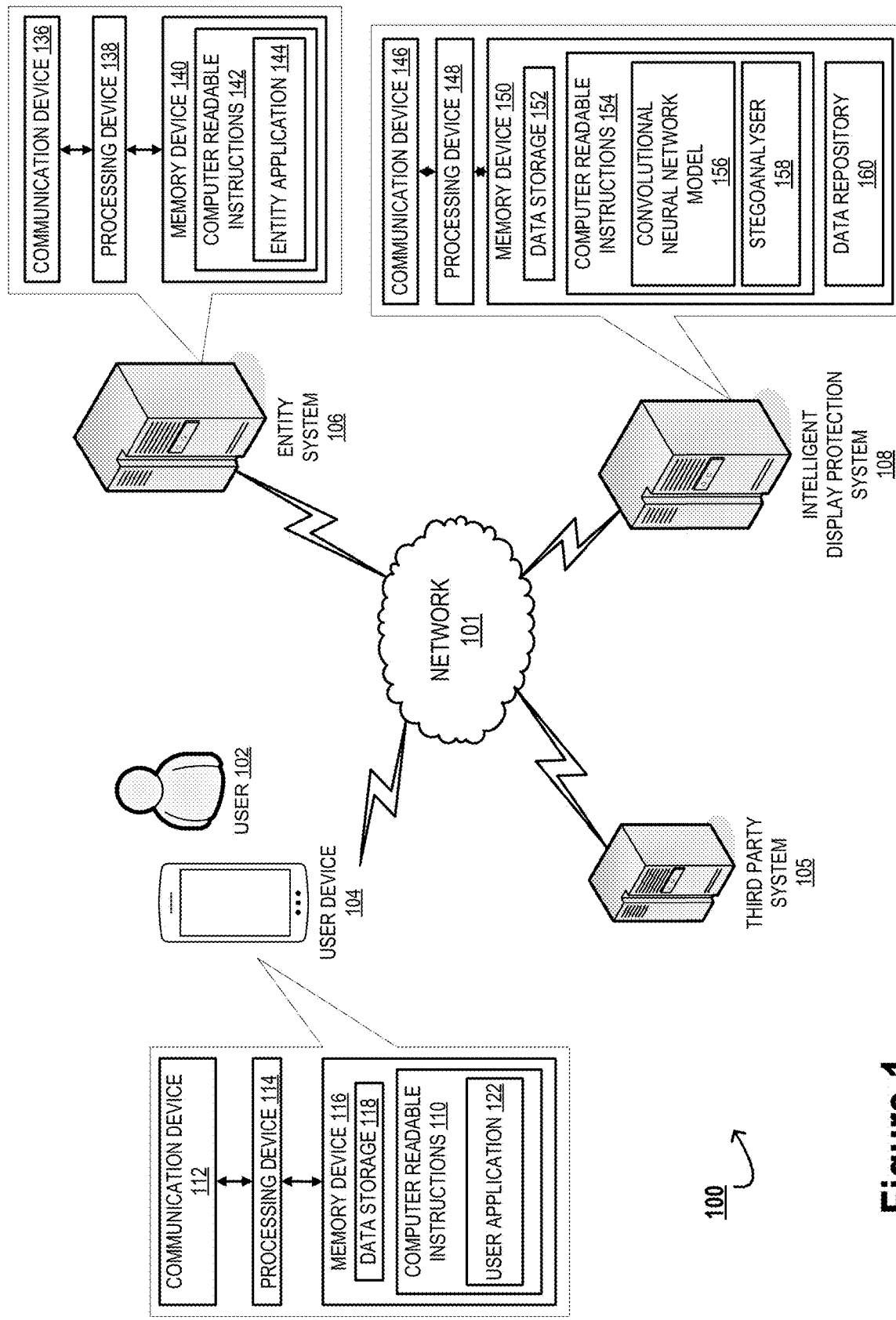
Figure 2:
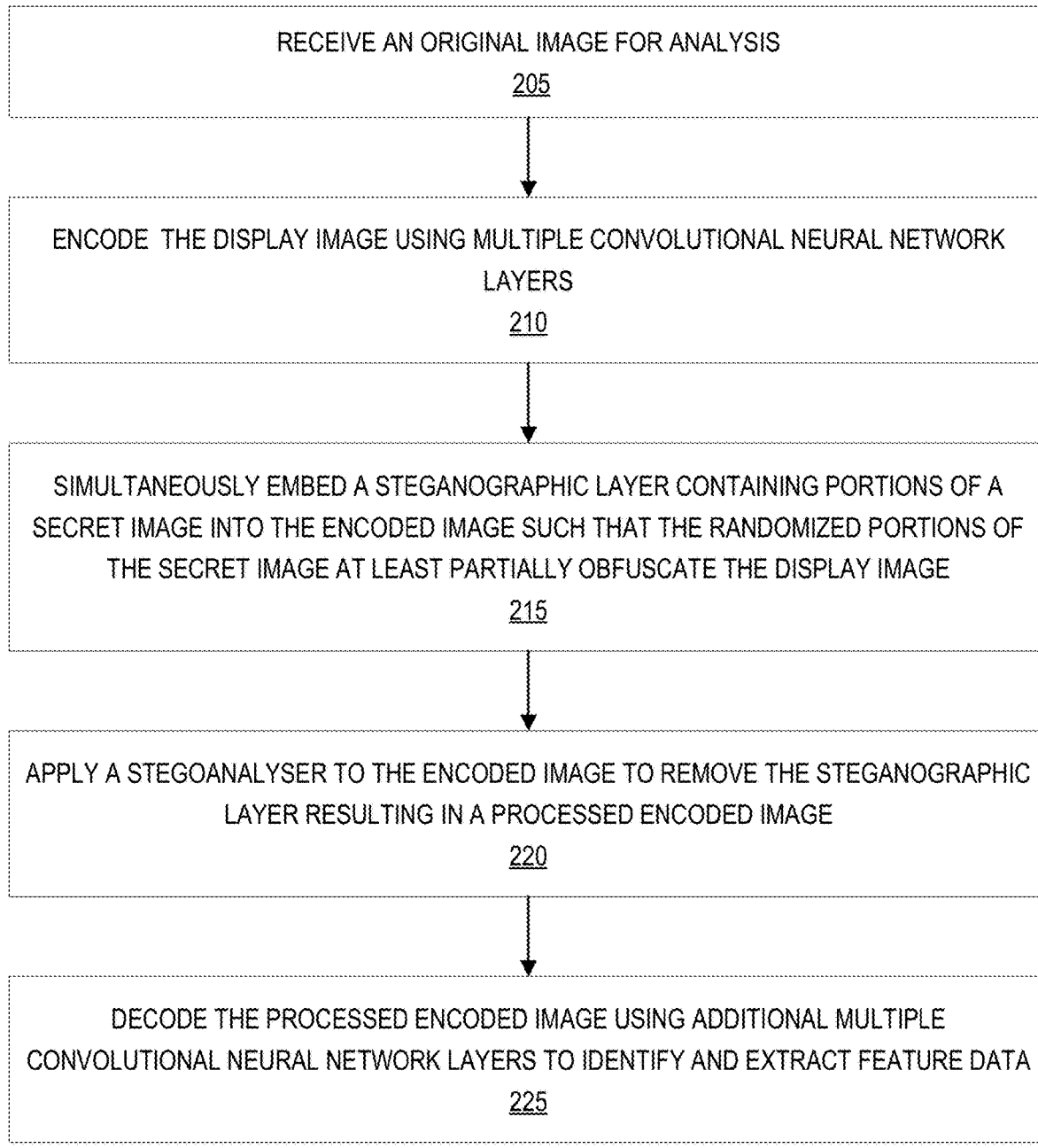
Figure 3:
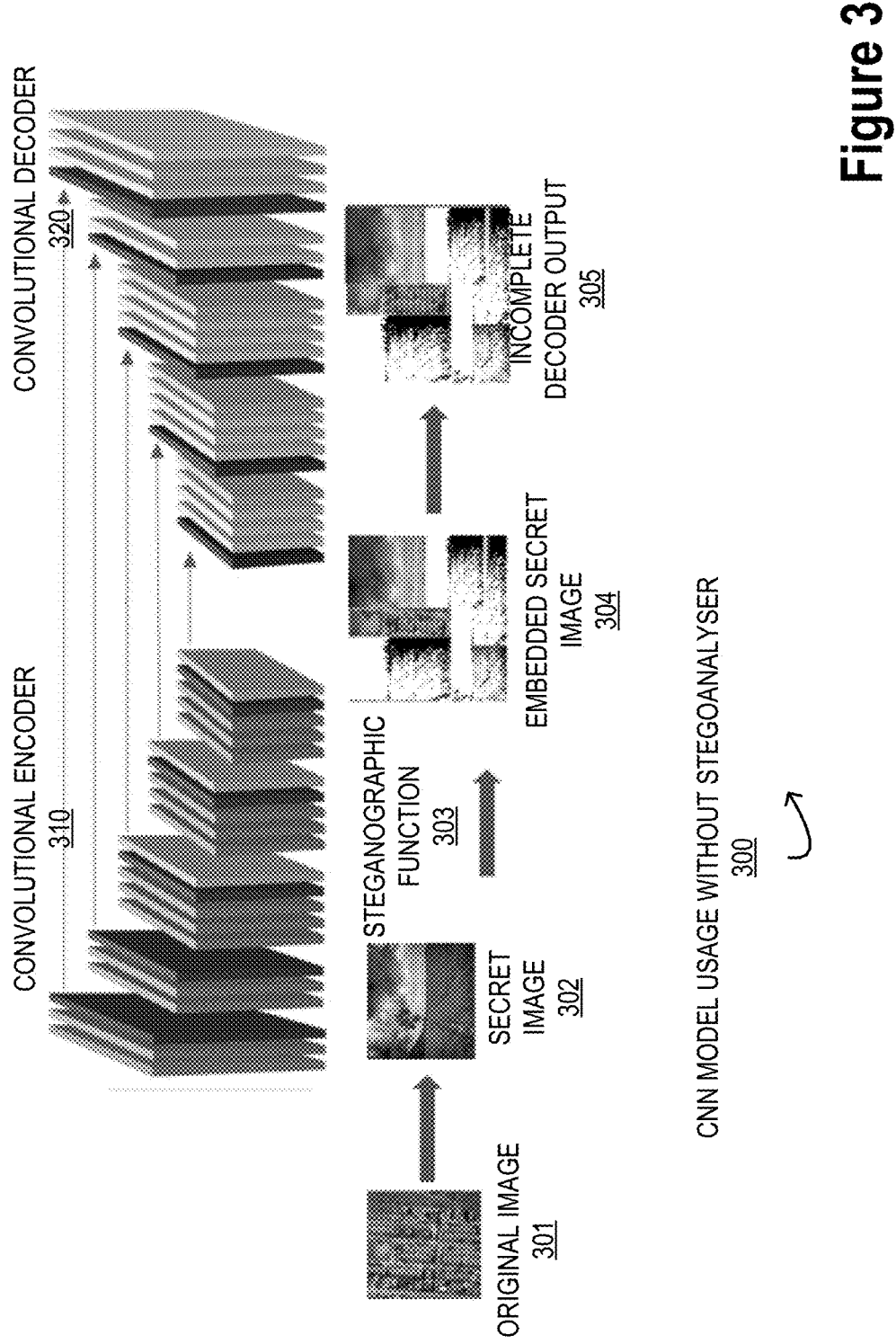
Figure 4:
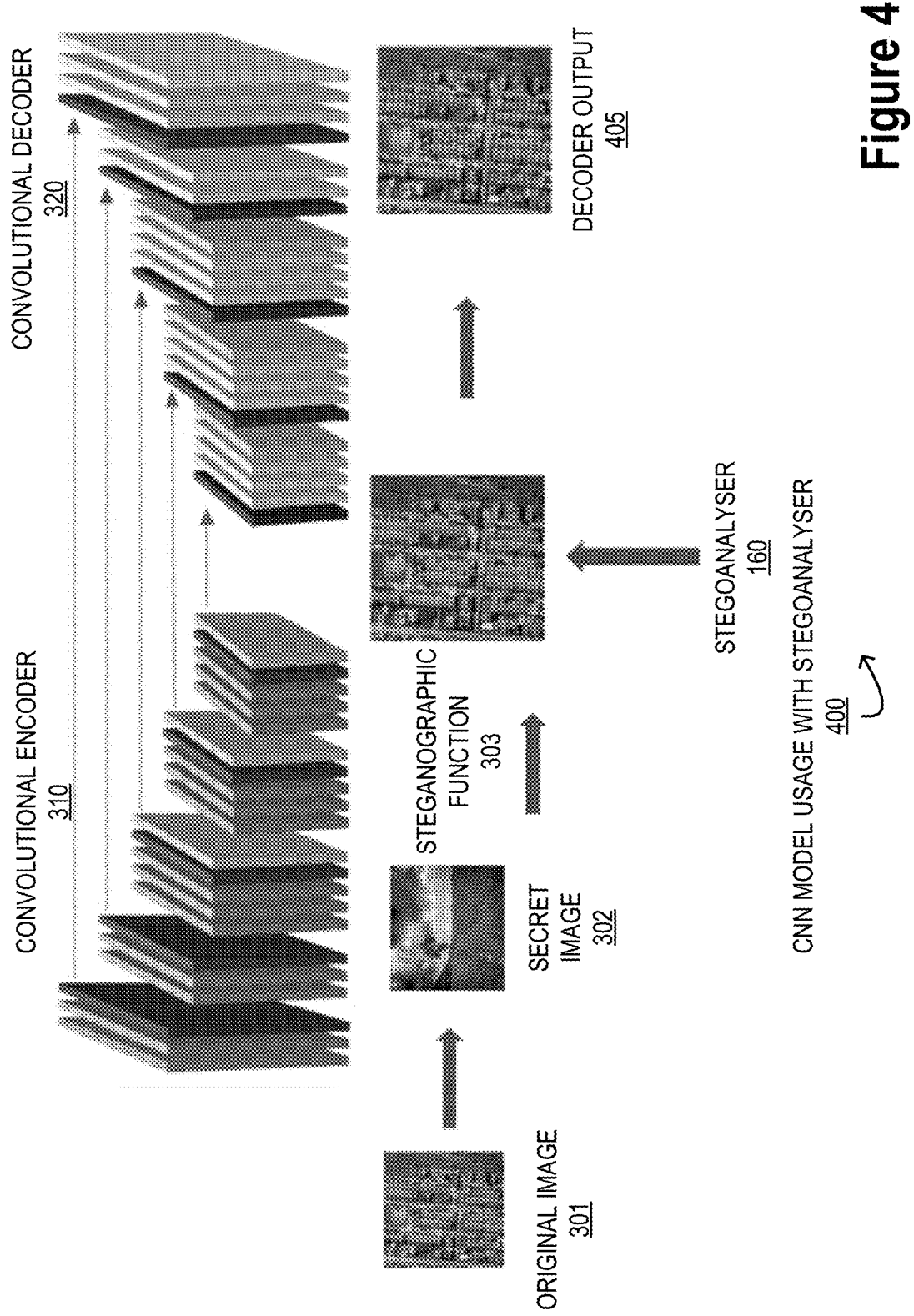
Figure 5A:
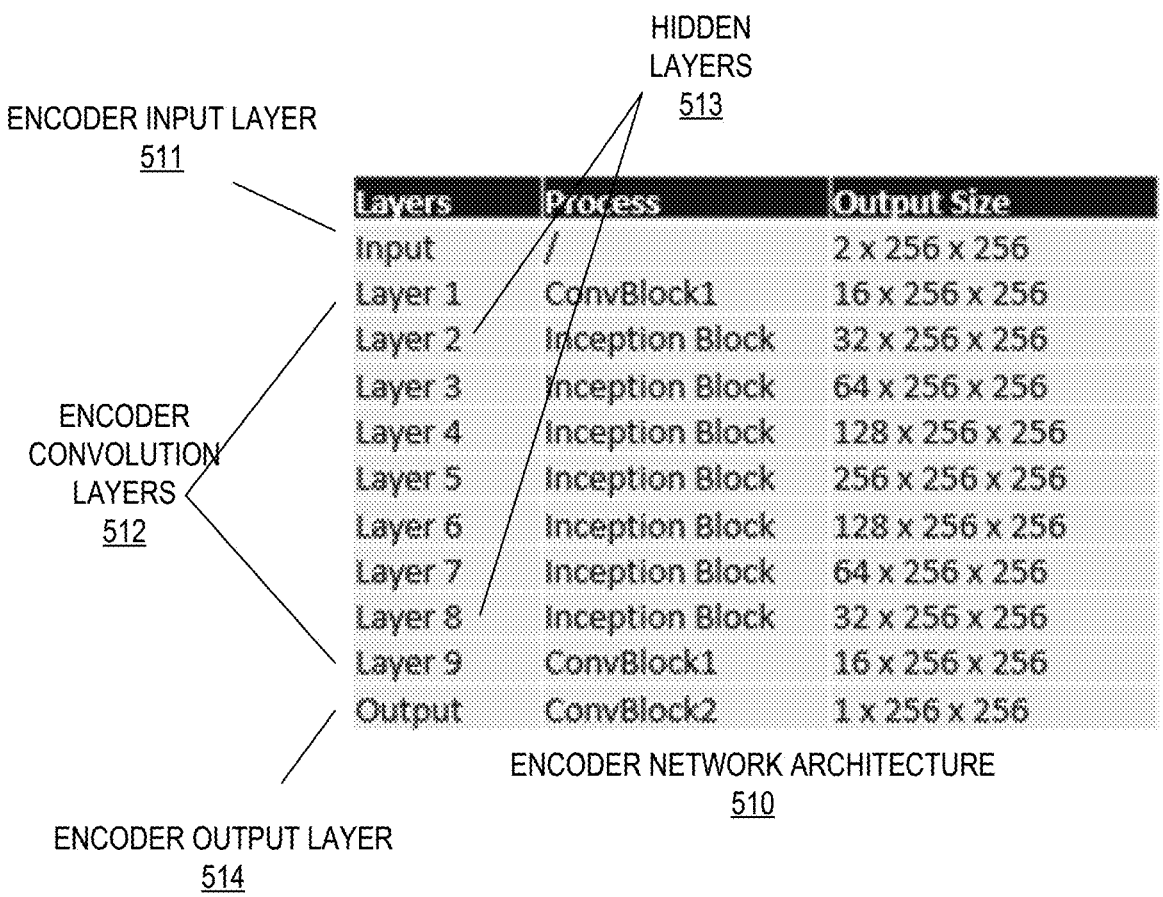
Figure 5C:
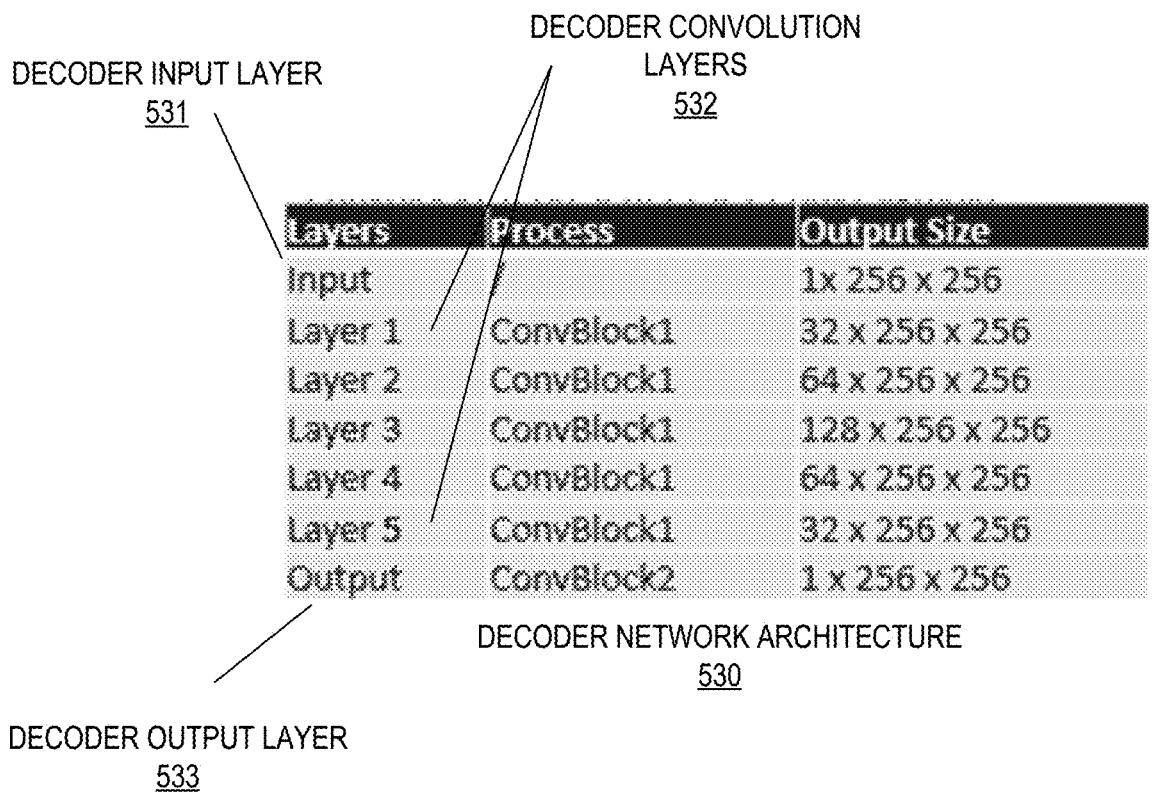
Figure 6:
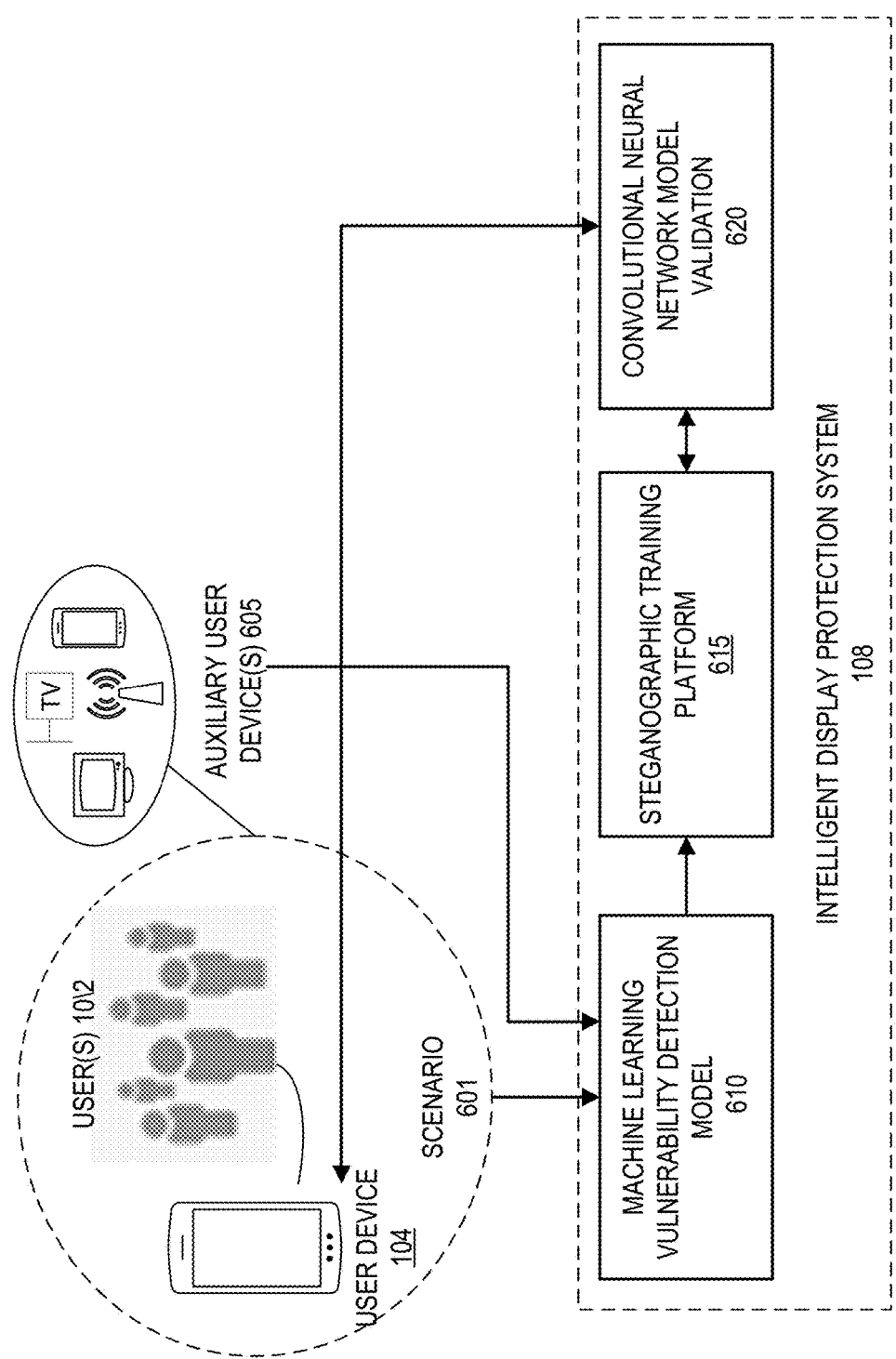

Having thus described embodiments of the invention in general terms, reference will now be made to the accompanying drawings, wherein:

FIG. 1 depicts an intelligent display protection system environment 100, in accordance with one embodiment of the present invention;

FIG. 2 depicts a process flow 200 for intelligent steganographic display protection, in accordance with one embodiment of the present invention;

FIG. 3 depicts a process flow diagram of CNN model usage without stegoanalyser 300, in accordance with one embodiment of the present invention;

FIG. 4 depicts a process flow diagram of CNN model usage with stegoanalyser 400, in accordance with one embodiment of the present invention;

FIG. 5a depicts an encoder network architecture, in accordance with one embodiment of the present invention;

FIG. 5b depicts a stegoanalyser network architecture, in accordance with one embodiment of the present invention;

FIG. 5c depicts a decoder network architecture, in accordance with one embodiment of the present invention; and FIG. 6 depicts a process flow 600 for adaptive machine learning to determine dynamic system response, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

FIG. 1 depicts intelligent display protection system environment 100, in accordance with one embodiment of the present invention. As illustrated in FIG. 1, an intelligent display protection system 108 is operatively coupled, via a network 101 to a user device 104, to an entity system 106, and to a third party system 105. In this way, the intelligent display protection system 108 can send information to and receive information from the user device 104, the entity system 106, and the third party system 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the intelligent display protection system 108, is configured for receiving user device data and user data, discerning or inferring situational needs of the user, and implementing an intelligent dynamic screen protection process via the convolutional encoding and decoding of image data using one or more steganographic functions for the selective obfuscation of graphical image data.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide images for analysis, recognition and extraction, query the intelligent display protection system 108 for identified attributes, set parameters and metrics for data analysis, and/or receive/utilize centralized database information created and disseminated by the intelligent display protection system 108. As such, in some embodiments, the user 102 may be associated with the entity and/or a financial institution. In other embodiments, the user 102 may be associated with another system or entity, such as third party system 105, which may be granted access to the intelligent display protection system 108 or entity system 106 in some embodiments.

FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to various data from the system 108, or transmission of various data to the system 108. The processing device 114 is operatively coupled to the communication device 112 and the memory device 116. The processing device 114 uses the communication device 112 to communicate with the network 101 and other devices on the network 101, such as, but not limited to, the entity system 106, the intelligent display protection system 108 and the third party system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the intelligent display protection system 108 and/or the entity system 106 are configured to cause the processing device 114 to execute the computer readable instructions 110, thereby causing the user device 104 to perform one or more functions described herein, for example, via the user application 122 and the associated user interface.

As further illustrated in FIG. 1, the intelligent display protection system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, based on computer-readable instructions thereof, which may be stored in a memory device, for example, executing computer readable instructions 154 or computer-readable program code 154 stored in memory device 150 to perform one or more functions associated with the intelligent display protection system 108.

The processing device 148 is operatively coupled to the communication device 146 and the memory device 150. The processing device 148 uses the communication device 146 to communicate with the network 101 and other devices on the network 101, such as, but not limited to the entity system 106, the third party system 105, and the user system 104. As such, the communication device 146 generally comprises a modem, server, or other device for communicating with other devices on the network 101.

As further illustrated in FIG. 1, the intelligent display protection system 108 comprises the computer-readable instructions 154 stored in the memory device 150, which in one embodiment includes the computer-readable instructions for the implementation of a convolutional neural network model ("CNN model") 156. In some embodiments, the computer readable instructions 154 comprise executable instructions associated with the CNN model 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the CNN model 156 and its components/modules. The CNN model 156 is further configured to perform or cause other systems and devices to perform the various steps in processing software code, and organizing data as will be described in detail later on.

As such, the processing device 148 is configured to perform some or all of the data processing and event capture, transformation and analysis steps described throughout this disclosure, for example, by executing the computer readable instructions 154. In this regard, the processing device 148 may perform one or more steps singularly and/or transmit control instructions that are configured to the CNN model 156, entity system 106, user device 104, and third party system 105 and/or other systems and applications, to perform one or more steps described throughout this disclosure. Although various data processing steps may be described as being performed by the CNN model 156 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the intelligent display protection system 108 may include multiple systems, servers, computers or the like maintained by one or many entities. FIG. 1 merely illustrates one of those systems 108 that, typically, interacts with many other similar systems to form the information network. In one embodiment of the invention, the intelligent display protection system 108 is operated by the entity associated with the entity system 106, while in another embodiment it is operated by a second entity that is a different or separate entity from the entity system 106. In some embodiments, the entity system 106 may be part of the intelligent display protection system 108. Similarly, in some embodiments, the intelligent display protection system 108 is part of the entity system 106. In other embodiments, the entity system 106 is distinct from the intelligent display protection system 108.

In one embodiment of the intelligent display protection system 108, the memory device 150 stores, but is not limited to, the CNN model 156 as will be described later on with respect to FIG. 2. In one embodiment of the invention, the CNN model 156 may associated with computer-executable program code that instructs the processing device 148 to operate the communication device 146 to perform certain communication functions involving the third party system 105, the user device 104 and/or the entity system 106, as described herein. In one embodiment, the computer-executable program code of an application associated with the CNN model 156 may also instruct the processing device 148 to perform certain logic, data processing, and data storing functions of the application.

The processing device 148 is configured to use the communication device 146 to receive data, such as images, or metadata associated with images, transmit and/or cause display of extracted data and the like. In the embodiment illustrated in FIG. 1 and described throughout much of this specification, the CNN model 156 may perform one or more of the functions described herein, by the processing device 148 executing computer readable instructions 154 and/or executing computer readable instructions associated with one or more application(s)/devices/components of the CNN model 156.

As illustrated in FIG. 1, the entity system 106 is connected to the intelligent display protection system 108 and may be associated with a financial institution network. In this way, while only one entity system 106 is illustrated in FIG. 1, it is understood that multiple network systems may make up the system environment 100 and be connected to the network 101. The entity system 106 generally comprises a communication device 136, a processing device 138, and a memory device 140. The entity system 106 comprises computer-readable instructions 142 stored in the memory device 140, which in one embodiment includes the computer-readable instructions 142 of an institution application 144. The entity system 106 may communicate with the intelligent display protection system 108. The intelligent display protection system 108 may communicate with the entity system 106 via a secure connection generated for secure encrypted communications between the two systems for communicating data for processing across various applications.

As further illustrated in FIG. 1, in some embodiments, the intelligent display protection system environment 100 further comprises a third party system 105, in operative communication with the intelligent display protection system 108, the entity system 106, and/or the user device 104. Typically, the third party system 105 comprises a communication device, a processing device and memory device with computer readable instructions. In some instances, the third party system 105 comprises a first database/repository comprising software code or program component objects, and/or a second database/repository comprising functional source code associated with software or program component objects and attributes. These applications/databases may be operated by the processor executing the computer readable instructions associated with the third party system 105, as described previously. Although a single external third party system 105 is illustrated, it should be understood that, the third party system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a process flow 200 for intelligent steganographic display protection, in accordance with one embodiment of the present invention. The process flow 200 describes the overall process for implementing a steganographic protection on the display image of a user device. It is noted that integrating the steganographic image obfuscation process within an encoding phase of the overall process allows for key advantages. Namely, the ease of constructing the steganographic image is high through the use of convolutional neural network encoding, the resulting image is unforgeable due to the randomized nature of layers and eliminated pooling indices, embedded layers can be partially preserved, the resulting steganographic integrated secret image is not removable by third parties without the use of a separate analysis architecture referred to herein as the stegoanalyser 158, the steganographic image is securely integrated with the display image via encoding feature variance layers, and lastly, the steganographic image may be easily separated using the stegoanalyser 158.

As shown at block 205, the process begins when the system receives an original image for analysis, referred to in FIGS. 3 and 4 as original image 301. The original image 301 may be any number of graphical file types or variable frame rate video streams broken into individual frames. The system segments the original image 301 using an object mask filter to detect features in the image. In doing so, the system uses relative and proportional data to detect objects and attributes within the image. The system then classifies the features in the original image 301 based on data from a data repository 160 which may contain data from other images used to train the CNN model 156. For instance, the system may detect features within the image that correspond to certain chart types, such as, for example, pie charts, line graphs, scatter plots, bar graphs, or the like, while in other embodiments the system may detect features within the image that signify certain input fields, personal information, account information, or the like. In some embodiments the image attributes to be detected may be a number of other feature types, such as the detection and classification of buildings, building types, or number or buildings in topographical satellite image, or the like.

Next, the process proceeds wherein the system encodes the original image 301 using multiple convolutional neural network layers, as shown by block 210, and as further described in FIG. 5a. A convolutional neural network ("CNN") is a class of deep, feed-forward artificial neural networks, most commonly applied to analyzing visual imagery. Compared to other image classification algorithms, CNNs use relatively little pre-processing, and in some embodiments the CNN uses a recurring parametric network optimization to learn filters that traditionally are hand-engineered. This results in a reduction of human effort which offers a major advantage over conventional applications. In some embodiments, the present invention utilizes a mask region CNN ("Mask RCNN") in order to segment images and analyze pixel content in order to identify and extract image attributes based on their particular contours, and identify these attributes using mask layers.

The system may then identify and extract data series and contours from the image, wherein the data series and contours and partially identified based on relative and proportional data determined by the object mask layer. In some embodiments, the recognition of data series from contours may be achieved by use of a combination of regression analysis, text mining, and classification analysis. This data may be organized and stored in data repository 160 such that it can be easily incorporated into a detailed dashboard of image features. The process may apply an optical character recognition process to transform any identified text data into a searchable format, and generates a segmented image. Segmented information and identified text data is compiled and stored in the data repository 160 for incorporation in a selective output of masked or unmasked image features. The processed image may be compared to the original image 301 to validate that the resulting segmented image maintains an accurate overall depiction, or a depiction which retains viewability from one or more specific angles of view.

As shown in block 215, the system simultaneously embeds a steganographic layer containing randomized portions of a secret image into the encoded image such that the selected randomized portions of the secret image are undetectable, yet visibly apparent as obfuscation, as further described in FIGS. 5a and 5b. The system may encrypt and stores pooling indices for the randomized portions of the secret image in encoding feature variance layers of the encoded image. Pooling indices are eliminated from hidden feature variance layers such that the resulting encoded image containing the steganographic layer cannot be deconstructed without using stegoanalyser 158.

The process proceeds to block 220 where a stegoanalyser, such as stegoanalyser 158, is applied to the encoded image to remove the steganographic layer, resulting in a processed encoded image that can be effectively fed to the decoder network architecture for decoding and feature detection. Finally, the process proceeds to the decoding step wherein the processed encoded image is decoded using multiple additional convolutional neural network layers to identify and extract features data.

FIG. 3 depicts a process flow diagram of CNN model usage without stegoanalyser 300, in accordance with one embodiment of the present invention. As shown, the model receives an original image 301 for processing at the convolutional encoder 310. The original image 301 is encoded and convoluted using a number of convolutional layers, as further described in FIG. 5a, wherein multiple filters are applied to the original image 301 in order to detect features within the original image 301. Any number of convolutional layers containing various filters may be applies to the original image 301 in order to identify boundaries and complex shapes within the image which correspond with features that the CNN model 156 is trained to identify.

The features identified by the model may vary based on the application of the CNN model 156. For instance, the model may be trained to detect boundaries within the original image 301 that correspond to charts, graphs, tables, or images of any number of objects or object characteristics. Shown in FIG. 3 is an original image 301 represented by a topographical satellite image of a cluster of buildings. In some embodiments, such as the one shown in FIG. 3, the CNN model 156 may be trained to identify and extract the separate buildings from the original image 301. In a typical CNN model, the original image 301 would be fed through a number of convolutional layers resulting in an output image that is then fed directly to the convolutional decoder 320. However, in the present invention, the convolution encoder contains a number of additional encoding layers embedded within the encoding architecture that are designed to insert portions of one or more secret images into the resulting encoded output image, which may visually obscure some or all of the information of the original image for security purposes.

The insertion of additional image data containing portions of secret images is represented in FIG. 3 by secret image 302. As shown, the stenographic function 303 that exists within the convolutional encoder 310, incorporates image data from the secret image 302 into encoded image, resulting in embedded secret image 304. As shown by incomplete decoder output 305, feeding the embedded secret image 304 directly into the convolutional decoder 320 will result in an incomplete feature map containing portions of the secret image 302. As such, the convolutional decoder 320 will be unable to fully identify the relevant features from the original image 301. The steganographic function 303 embeds the secret image 302 in such a way that is undetectable by users who are unaware of that the steganographic function 303 exists within the convolutional encoder 310. As such, the CNN model 156 will not fully function without stegoanalyser 158.

FIG. 4 depicts a process flow diagram of CNN model usage with stegoanalyser 400, in accordance with one embodiment of the present invention. In contrast with FIG. 3, which depicts a CNN model usage without stegoanalyser, the use case depicted in FIG. 4 includes an additional critical step between the convolutional encoder 310 and convolutional decoder 320, wherein the stegoanalyser is applied to the encoded image to remove the secret image and pass the output to the convolutional decoder 320 where the CNN model completes analysis and identification of relevant features.

As shown, the model receives an original image 301 for processing at the convolutional encoder 310. The original image 301 is encoded and convoluted using a number of convolutional layers, as further described in FIG. 5a, wherein multiple filters are applied to the original image 301 in order to detect features within the original image 301. Any number of convolutional layers containing various filters may be applied to the original image 301 in order to identify boundaries and complex shapes within the image which correspond with features that the CNN model 156 is trained to identify. In the embodiment depicted in FIG. 4, the original image 301 is again a topographical map containing multiple buildings. While the CNN model may be trained to detect boundaries within the original image 301 that correspond to any number of features including charts, graphs, tables, or images of any number of physical objects or object characteristics, the topographical satellite image is used again here for illustration.

The insertion of additional image data containing portions of secret images is represented by secret image 302. As shown, the steganographic function 303 that exists within the convolutional encoder 310 incorporates image data from the secret image 302 into encoded image which results in an embedded secret image 304. However, as shown in FIG. 4, stegoanalyser 158 is applied to the output data of the convolutional encoder 310 in order to produce encoded output data that does not contain the secret image 302, therefore removing the obfuscation of the original image by the portions of the secret image which were applied during convolutional encoding. As such, the convolutional decoder 320 receives data from stegoanalyser 158 which can be decoded properly and results in decoder output 405, mirroring the original image 301. In contrast to the CNN model depicted by FIG. 3, the incorporation of the stegoanalyser 158 makes a critical difference by removing the embedded secret image prior to the decoding process, allowing the features of the original image 301 to be fully identified based on the CNN model 156.

FIG. 5a depicts an encoder network architecture 510, in accordance with one embodiment of the present invention. The encoder network architecture 510 consists of various layers as depicted by encoder input layer 511, encoder convolution layers 512, hidden layers 513, and encoder output layer 514. The encoder input layer 511 receives the original image 301 for processing and reduces the original image 301 to a grayscale processed image before passing it to the various layers 1 through 9 for convolution and embedding of secret image 302.

As shown in the particular embodiment represented in FIG. 5a, layer 1 and layer 9 are "ConvBlock" layers, labeled here as encoder convolution layers 512. In other embodiments, the encoder network architecture 510 may contain any number of encoder convolution layers 512, which act as layers for applying filters to the processed image. As with any CNN, the CNN model 156 applies filters as matrices which are combined with pixel data from the image in order to identify boundaries via the encoder convolution layers 512. The CNN model 156 calculates the dot product of the filter layers with regions of the processed image to calculate output data that contains an indication of identified features based on the content of the filter layers. The filter layers may vary in size, containing a number of different rows and columns. For instance, a filter layer may contain three rows and three columns ("3×3") which are combined to calculate the dot product of 3×3 regions of the processed image to identify feature boundaries.

As the filters are applied to the image, each encoder convolution layer 512 contains a pooling step where the dimension of the encoded image is reduced to highlight only critical information. Data about how the encoded images are reduced is stored as a pooling index. These pooling indices are carried over into the decoding network and the decoding network applies additional convolution layers which expand the pooling indices to predict the original image 301. In some embodiments, the CNN model 156 may use a min or max pooling method, while in other embodiments the CNN model 156 may use an average pooling method. Each encoder convolution layer 512 may also contains a batch normalization step which scales the encoded image data to a normalized scale. Applying batch normalization at encoder convolution layers effectively reduces internal covariance shift and aids in reaching convergence of the decoded image as compared to the original image 301 by giving the CNN model 156 more generic decision functions. The filters used in the CNN model 156 are trained over time using a feedback process of encoding and decoding in order to achieve a resultant model which can identify a specific feature set. The data within the matrices of the filters is weighted to identify specific features based on training data.

Returning to the exemplary embodiment used in FIGS. 3 and 4, the CNN model 156 may be trained to contain filters for identifying buildings in a topographical satellite image, for instance, or a secure web form containing personally identifiable information, account information, other sensitive information, or the like. Any image introduced into the CNN model 156 will contain some non-uniformity with respect to how the features are distributed throughout the overall image. For instance, the buildings in a satellite image may not be distributed in a linear fashion throughout the image, web forms may vary in the arrangement and types of fields shown, or the like, and so the CNN model 156 must contain a non-linear activation function which is applied in each encoding convolution layer 512 in order to account for this non-uniformity. In other words, taking the example of the satellite image, since an increase in number of buildings identified is not linearly correlated with movement in strictly the x axis direction or movement in the y axis direction, the model must account for this non-linearity by applying the non-linear activation function. In some embodiments the non-linear activation function used in the convolution layers may be a "tan h," "sigmoid," or "LeakyReLU" algorithm. The filter size, batch normalization function, and non-linear activation function may differ for each layer. For instance, layer 1 may comprise a 3×3 convolution filter, batch normalization and application of a LeakyReLU non-linear activation function, while the output layer, labeled encoder output layer 514, may comprise a 1×1 convolution filter and a Tan h non-linear activation function.

Also depicted in FIG. 5a are layers 2 through layer 8 which are labeled as hidden layers 513. These layers are where the CNN model 156 embeds the secret image within the encoded image. These layers are not available to the user, but the overall output of the encoded image may obfuscate certain portions of the original image, and in some cases may only obfuscate the original image from certain viewing angles. For example, in the embodiment depicted in FIG. 5a, the user can only view the input layer, layer 1, layer 9 and the output layer. In this way, the inception blocks in the hidden layers 513 act as a black box that will not reveal to the user exactly how the secret image is embedded between convolution steps by the steganographic function 303, therefore removing the ability for an unauthorized user to reverse the embedding of the secret image. Finally, the encoder output layer 514 encode the image using the output layer process, which can be fed to either stegoanalyser network architecture 520 or directly to decoder network architecture 530.

FIG. 5b depicts a stegoanalyser network architecture 520, in accordance with one embodiment of the present invention. The stegoanalyser network architecture 520 receives an input at stegoanalyser input layer 521, which corresponds to the data from encoder output layer 514. The encoder output layer 514 is encoded and convoluted using a number of convolutional layers wherein multiple filters are applied to the encoder output layer 514 in order to remove the embedded secret image 302 and prepare the processed image for entry into the decoder network architecture 530.

As discussed in FIGS. 4 and 5a, the steganographic function 303 that exists within the convolutional encoder 310 incorporates image data from the secret image 302 into encoded image which results in an embedded secret image 304. The stegoanalyser network architecture 520 is programmed to discern the output data from encoder network architecture 510 and remove the secret image that was embedded using hidden layers 513. This is done using the stegoanalyser convolution layers 522, as shown in FIG. 5b at layers 1 through 5. As with the encoder network architecture 510, each of the stegoanalyser convolution layers 522 also contains a batch normalization step which scales the encoded image data to a normalized scale. Applying batch normalization at convolution layers effectively reduces internal covariance shift and aids in reaching convergence of the decoded image as compared to the original image 301 by giving the CNN model 156 more generic decision functions. In addition, each stegoanalyser convolution layer 522 contains a non-linear activation function which is applied in each stegoanalyser convolution layer 522 in order to account for non-linearity of feature distribution within the processed image. The filter size, batch normalization function, and non-linear activation function may differ for each layer. Finally, the stegoanalyser network architecture 520 completes at stegoanalyser output layer 523 which prepares the output data from the stegoanalyser network architecture 520 to be received by the decoder network architecture 530 using SPP block shown at layer 6.

FIG. 5c depicts a decoder network architecture 530, in accordance with one embodiment of the present invention. The decoder network architecture 530 consists of various layers as depicted by decoder input layer 531, decoder convolution layers 532, and decoder output layer 533. The decoder input layer 531 receives the image data for processing from either the encoder network architecture 510 or the stegoanalyser network architecture 520, depending on if the embodiment of the invention includes a CNN model without usage of the stegoanalyser 158 or with the stegoanalyser 158, respectively. The decoder network architecture 530 applies iterations of convolution on the decoder input data as shown at decoder convolution layers 532, depicted by layers 1 through 5 of the decoder network architecture 530. In other embodiments, the decoder network architecture 530 may contain any number of decoder convolution layers 532 which act as layers for applying filters for identifying features in the processed image.

As with the encoder network architecture 510, each of the decoder convolution layers 532 also contains a batch normalization step which scales the encoded image data to a normalized scale. Applying batch normalization at convolution layers effectively reduces internal covariance shift and aids in reaching convergence of the decoded image as compared to the original image 301 by giving the CNN model 156 more generic decision functions. In addition, each decoder convolution layer 532 contains a non-linear activation function which is applied in each stegoanalyser convolution layer 522 in order to account for non-linearity of feature distribution within the processed image. The result of decoder network architecture 530 is decoder output layer 533 depicted at output layer on the decoder network architecture 530 which contains a set of mapped features on the resulting image which matches the dimensional and pixel characteristics of the original image 301.

FIG. 6 depicts a process flow 600 for adaptive machine learning to determine dynamic system response, in accordance with one embodiment of the present invention. The process flow 600 describes the overall process for determining a user device location, situational state, scenario, or the like, and implementing a dynamically appropriate steganographic protection structure. As shown in the upper left-hand corner, the user device 104 may be in communication with one or more auxiliary user device(s) 605. In addition, the user 102 may be in proximity to one or more other user(s) 102, which may be utilizing one more additional user device(s) 102, and so on. Various instances of proximity to additional user(s) 102 and auxiliary user devices 605 may be recognized by the intelligent display protection system 108 as one or more scenario(s) 601. The user 102 may authorize data to be transmitted and shared between the intelligent display protection system 108 and the user device 104, and such data may be used to infer certain characteristics of the scenario 601, and the system 108 may annotate this data in order to generate annotated user device data 104.

For instance, in some embodiments, the user device 104 may transmit location data to the system 108, which the system may cross reference with publicly available data or previously stored data in the data repository 160 in order to determine that the user device 104 is in a public location (e.g., an airport, cafe, or the like). In other embodiments, the user device 104 may transmit data indicating a state of operation, such as current network connectivity data, an IP address, or the like, which may allow the system to determine the location of the user device 104. In still further embodiments the user device 104 may be communicating with the system 108 via one or more auxiliary user devices 605, such as a public WiFi network, or the like, which may be indicated by the incoming packets of the data stream between user device 104 and system 108 (e.g., the geolocation of a public WiFi network address may be known prior by the system 108, and the incoming data stream may indicate that the user is transmitting information over the public WiFi network, therefore evidencing that the user is in a public location, or the like). In still further embodiments, auxiliary user devices 605 may be in separate communication with the system 108, and in these instances, the system 108 may correlate or cross-reference data received directly from the user device 104 and the auxiliary user devices 605 in order to determine that the devices are in proximity to one another (e.g., the geolocation of a public WiFi network address may be known prior by the system 108, and cross referenced with geolocation data of the user device to determine that the user is in a public location, or the like).

The system 108 receives data from scenario 601 and intelligently correlates this data to identify user pattern behavior and preferences using machine learning vulnerability detection model 610. For instance, in some instances, the user 102 may manually enable the intelligent display protection system 108, and the system may annotate received data from the user device 104 and auxiliary user devices 605 at that same time in order to note that that the user prefers privacy and screen protection in a given scenario. In some embodiments, the system may store user configuration data unique to each user which contains specific preferences for which locations to activate screen protection. In other embodiments, the activation of screen protection may be based on a set time-based schedule that the user programs. In further embodiments, the system may learn over time that specific days, times, location, or that certain a combinations of any of these specific factors constitute scenarios where the user prefers screen protection to be activated. Over time, the machine learning vulnerability detection model 610 may receive additional data from one or more users 102 and use this data as training data for the steganographic training platform 615. As shown, convolutional neural network model validation 620 may be achieved via communication with the user device 104 to confirm that the intelligently obfuscated output and determined scenarios requiring privacy protection are preferable or acceptable to the user 102.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for intelligent steganographic graphical data protection for use in screen protection of information displayed on a graphical interface of a user device, the system comprising:
 a processing device;

a non-transitory storage device containing instructions when executed by the processing device, causes the processing device to perform the steps of:
receiving an original image for analysis from a user device, wherein the original image comprises an image to be displayed on a graphical user interface of the user device;
encoding the original image using multiple convolutional neural network layers;
embedding, simultaneously, a steganographic layer containing randomized portions of a secret image into the encoded image such that the randomized portions of the secret image obscure portions of the original image;
encrypting and storing pooling indices for the randomized portions of the secret image in encoding feature variance layers of the encoded image to thereby create an obscured image; access user-specific location or time preference data, wherein the user-specific location or time preference data comprise specific locations or times wherein the user prefers to activate screen protection;
comparing the user-specific location or time preference data to current geolocation of the user device or a time of day at the current geolocation of the user device; and
in response to the user-specific location or time preference data matching either the geolocation of the user device or the time of day at the current geolocation of the user device, send the obscured image to the user device for display on the graphical user interface.

2. The system of claim 1, wherein the non-transitory storage device containing instructions when executed by the processing device further causes the processing device to perform the steps of:
applying a stegoanalyser to the encoded image to remove the steganographic layer resulting in a processed encoded image; and
decoding the processed encoded image using additional multiple convolutional neural network layers to identify and extract feature data.

3. The system of claim 1, wherein the multiple convolutional neural network layers further comprise batch normalization to normalize a scale of the encoded image and reduce internal covariance shift between the multiple convolutional neural network layers.

4. The system of claim 1, wherein the multiple convolutional neural network layers further comprise using one or more linear-activation functions.

5. The system of claim 1, wherein embedding the steganographic layer containing randomized portions of the secret image further comprises applying multiple hidden convolutional layers during encoding and wherein the hidden layers are applied between at least two separate convolutional neural network layers.

6. The system of claim 1, wherein the non-transitory storage device containing instructions when executed by the processing device further causes the processing device to perform the steps of:
receiving geolocation data associated with the user device;
based on the geolocation data, determining that the user device is in a public location; and
determine portions of the original image to obscure based on the user device being in a public location.

7. The system of claim 1, wherein the non-transitory storage device containing instructions when executed by the processing device further causes the processing device to perform the steps of:
storing the user-specific location or time preferences in the at least one memory device; and
continuously monitoring geolocation data or time of day data at the geolocation of the user device.

8. A computer program product for intelligent steganographic graphical data protection for use in screen protection of information displayed on a graphical interface of a user device with at least one non-transitory computer-readable medium having computer-readable program code portions embodied therein, the non-transitory computer-readable program code portions comprising:
an executable portion configured to receive an original image for analysis from a user device, wherein the original image comprises an image to be displayed on a graphical user interface of the user device;
an executable portion configured to encode the original image using multiple convolutional neural network layers;
an executable portion configured to embed, simultaneously, a steganographic layer containing randomized portions of a secret image into the encoded image such that the randomized portions of the secret image obscure portions of the original image;
an executable portion configured to encrypt and store pooling indices for the randomized portions of the secret image in encoding feature variance layers of the encoded image to thereby create an obscured image;
an executable portion configured to access user-specific location or time preference data, wherein the user-specific location or time preference data comprise specific locations or times wherein the user prefers to activate screen protection;
an executable portion configured to compare the user-specific location or time preference data to current geolocation of the user device or a time of day at the current geolocation of the user device; and
in response to the user-specific location or time preference data matching either the geolocation of the user device or the time of day at the current geolocation of the user device, an executable portion configured to send the obscured image to the user device for display on the graphical user interface.

9. The computer program product of claim 8, wherein at least one non-transitory computer-readable medium having computer-readable program code portions embodied therein, the non-transitory computer-readable program code portions further comprise:
an executable portion configured to apply a stegoanalyser to the encoded image to remove the steganographic layer resulting in a processed encoded image; and
an executable portion configured to decode the processed encoded image using additional multiple convolutional neural network layers to identify and extract feature data.

10. The computer program product of claim 8, wherein the multiple convolutional neural network layers further comprise batch normalization to normalize a scale of the encoded image and reduce internal covariance shift between the multiple convolutional neural network layers.

11. The computer program product of claim 8, wherein the multiple convolutional neural network layers further comprise using one or more linear-activation functions.

12. The computer program product of claim 8, wherein embedding the steganographic layer containing randomized portions of the secret image further comprises applying multiple hidden convolutional layers during encoding and wherein the hidden layers are applied between at least two separate convolutional neural network layers.

13. The computer program product of claim 8, wherein at least one non-transitory computer-readable medium having computer-readable program code portions embodied therein, the non-transitory computer-readable program code portions further comprise:
   an executable portion configured to receive geolocation data associated with the user device;
   an executable portion configured to, based on the geolocation data, determine that the user device is in a public location; and
   an executable portion configured to determine portions of the original image to obscure based on the user device being in a public location.

14. The computer program product of claim 8, wherein at least one non-transitory computer-readable medium having computer-readable program code portions embodied therein, the non-transitory computer-readable program code portions further comprise:
   an executable portion configured to store the user-specific location or time preferences in the at least one memory device; and
   an executable portion configured to continuously monitor geolocation data or time of day data at the geolocation of the user device.

15. A computer-implemented method for intelligent steganographic graphical data protection for use in screen protection of information displayed on a graphical interface of a user device, the method comprising:
   receiving an original image for analysis from a user device, wherein the original image comprises an image to be displayed on a graphical user interface of the user device;
   encoding the original image using multiple convolutional neural network layers;
   embedding, simultaneously, a steganographic layer containing randomized portions of a secret image into the encoded image such that the randomized portions of the secret image obscure portions of the original image;
   encrypting and store pooling indices for the randomized portions of the secret image in encoding feature variance layers of the encoded image to thereby create an obscured image;
   accessing user-specific location or time preference data, wherein the user-specific location or time preference data comprise specific locations or times wherein the user prefers to activate screen protection;
   comparing the user-specific location or time preference data to current geolocation of the user device or a time of day at the current geolocation of the user device; and
   in response to the user-specific location or time preference data matching either the geolocation of the user device or the time of day at the current geolocation of the user device, sending the obscured image to the user device for display on the graphical user interface.

16. The computer-implemented method of claim 15, the method further comprising:
   applying a stegoanalyser to the encoded image to remove the steganographic layer resulting in a processed encoded image; and
   decoding the processed encoded image using additional multiple convolutional neural network layers to identify and extract feature data.

17. The computer-implemented method of claim 15, wherein the multiple convolutional neural network layers further comprise batch normalization to normalize a scale of the encoded image and reduce internal covariance shift between the multiple convolutional neural network layers.

18. The computer-implemented method of claim 15, wherein the multiple convolutional neural network layers further comprise using one or more linear-activation functions.

19. The computer-implemented method of claim 15, the method further comprising:
   receiving geolocation data associated with the user device;
   based on the geolocation data, determining that the user device is in a public location; and
   determining portions of the original image to obscure based on the user device being in a public location.

20. The computer-implemented method of claim 15, the method further comprising:
   storing the user-specific location or time preferences in the at least one memory device; and
   continuously monitoring geolocation data or time of day data at the geolocation of the user device.

* * * * *